(12) United States Patent
Konishi et al.

(10) Patent No.: US 8,308,192 B2
(45) Date of Patent: Nov. 13, 2012

(54) AIRBAG DEVICE (75) Inventors: Shuhei Konishi, Settsu (JP); Tomoki Hashizume, Minoh (JP); Miwa Matsuoka, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 174 days.

(21) Appl. No.: 12/988,955

(22) PCT Filed: Apr. 15, 2009

(86) PCT No.: PCT/JP2009/057596
§ 371 (c)(1),
(2), (4) Date: Dec. 9, 2010

(87) PCT Pub. No.: WO2009/131046
PCT Pub. Date: Oct. 29, 2009

(65) Prior Publication Data
US 2011/0101658 A1 May 5, 2011

(30) Foreign Application Priority Data
Apr. 23, 2008 (JP) .................................. 2008-112866

(51) Int. Cl.
*B60R 21/237* (2006.01)
(52) U.S. Cl. ................... 280/743.1; 280/730.2
(58) Field of Classification Search ............... 280/743.1, 280/730.2, 729; 493/405
See application file for complete search history.

(56) References Cited

U.S. PATENT DOCUMENTS 4,286,954 A * 9/1981 McArthur et al. ............ 493/244
5,992,882 A 11/1999 Ito et al.
6,106,006 A * 8/2000 Bowers et al. ............. 280/730.2
(Continued)

FOREIGN PATENT DOCUMENTS
JP 9-207698 A 8/1997
(Continued)

OTHER PUBLICATIONS

Chinese Office Action corresponding to Chinese Patent Application No. 200980113769.1, dated May 3, 2012.

*Primary Examiner* — Joseph Rocca
*Assistant Examiner* — George Spisich
(74) *Attorney, Agent, or Firm* — Sughrue Mion, PLLC (57) ABSTRACT

An airbag is quickly inflated and deployed along an inner side wall of a vehicle while suppressing variations of the deployment direction of the airbag inflated and deployed from an upper part of the vehicle. An upper edge side of an airbag (2), which deploys first, is bellows-folded to form a bellows portion (2J), and a lower edge side continuous with the bellows portion (2J) is roll-folded toward the vehicle's exterior side (G) to form a roll-folded portion (2R). The roll-folded portion (2R) is formed to have a larger width than the bellows portion (2J) in the vehicle's width direction and the both sides thereof are folded back upward. The bellows portion (2J) is folded in substantially half and is wrapped by the roll-folded portion (2R) from below and is accommodated therein. When the airbag (2) deploys, first, the bellows portion (2J), whose deployment is restricted by the roll-folded portion (2R) on both sides, deploys toward the lower side of the vehicle, and the roll-folded portion (2R) is pushed by the deployment force thereof toward the trim (50) and opens the trim (50), through which the roll-folded portion (2R) pops out and deploys in the vehicle.

16 Claims, 6 Drawing Sheets

U.S. PATENT DOCUMENTS

| | | |
|---|---|---|
| 6,196,585 B1 * | 3/2001 | Igawa .................. 280/743.1 |
| 6,293,581 B1 | 9/2001 | Saita et al. |
| 6,371,512 B1 | 4/2002 | Asano et al. |
| 7,261,682 B2 * | 8/2007 | Crookston et al. ............ 493/457 |
| 7,404,790 B2 * | 7/2008 | Sugaya et al. ............... 493/458 |
| 7,766,376 B2 * | 8/2010 | Yokoyama ................ 280/730.2 |
| 7,806,433 B2 * | 10/2010 | Mitsuo et al. ............. 280/730.2 |
| 7,874,586 B2 * | 1/2011 | Budowick ................. 280/743.1 |
| 2003/0116947 A1 | 6/2003 | Yokoyama et al. |
| 2004/0075256 A1 | 4/2004 | Klaiber et al. |
| 2004/0251669 A1 * | 12/2004 | Fischer et al. ............. 280/743.1 |
| 2005/0062267 A1 * | 3/2005 | Recker et al. ............. 280/730.2 |
| 2005/0121887 A1 | 6/2005 | Inoue et al. |
| 2007/0075530 A1 | 4/2007 | Yokoyama |
| 2008/0054605 A1 | 3/2008 | Mitsuo et al. |
| 2008/0122208 A1 * | 5/2008 | Fukawatase et al. ...... 280/743.1 |
| 2010/0084841 A1 * | 4/2010 | Suemitsu et al. .......... 280/730.2 |

FOREIGN PATENT DOCUMENTS

| | | |
|---|---|---|
| JP | 11-321536 A | 11/1999 |
| JP | 2000-118346 A | 4/2000 |
| JP | 2000-296753 A | 10/2000 |
| JP | 2003-175792 A | 6/2003 |
| JP | 2004-58848 A | 2/2004 |
| JP | 2004-131072 A | 4/2004 |
| JP | 2005-178729 A | 7/2005 |
| JP | 2008-49991 A | 3/2008 |
| JP | 2012-011968 * | 1/2012 |

* cited by examiner

PRIOR ART

AIRBAG DEVICE

TECHNICAL FIELD

The present invention relates to airbag devices installed in vehicles, such as cars. In particular, it relates to an airbag device in which a folded airbag is attached to an upper part of an inner side wall of a vehicle, in the front-rear direction of the vehicle.

BACKGROUND ART

In order to protect an occupant in the driver's seat or the passenger seat of a vehicle in a collision or an emergency, cars having an airbag device that has an inflatable and deployable airbag and is installed in, for example, the steering wheel or the instrument panel are widely used. Furthermore, in recent years, in order to further enhance the function of protecting an occupant, including an occupant seated in the rear seat, a side airbag device that deploys an airbag in a curtain-like manner along an inner side wall window of the vehicle, between the window and the occupant, so as to cover the entirety thereof, is employed.

There is conventionally known an airbag device in which a folded airbag is stored at the upper edge of a window in a vehicle, the vehicle's interior side being covered with an airbag cover, and in which the upper part and lower part of the airbag are folded in different manners so that the airbag is quickly inflated and deployed along the inner side wall of the vehicle while suppressing protrusion toward the vehicle's interior side during inflation and deployment and that an occupant is more assuredly protected (see PTL 1).

In this conventional airbag device, the airbag is attached to a vehicle such that a main inflation portion on the lower edge side is roll-folded toward the vehicle's exterior side and a gas supply path portion continuous therewith, on the upper edge side, is folded in a non-roll-folded manner, which is easier to be deployed than roll-folding. By doing so, after the supply path portion of the airbag, to which gas flows in first, is quickly deployed and the airbag cover is push-opened, the roll-folding of the main inflation portion is unfolded and is deployed along the inner side wall of the vehicle. Thus, the occupant is received and restrained with this portion.

However, in this conventional airbag device, at the initial stage of deployment of the airbag, the supply path portion is inflated in the airbag cover, presses and push-opens the airbag cover toward the vehicle's interior side, and then pushes the roll-folded portion downward and deploys it. Therefore, the timing at which the roll-folded portion pops out of the airbag cover is delayed by the time necessary for the supply path portion to push-open the airbag cover and secure the exit port needed for the deployment of the roll-folded portion downward, which also delays the inflation and deployment of the airbag.

To counter this, conventionally, a roll-folded portion is disposed below (on the airbag cover side of) the non-roll-folded portion to cause the deploying non-roll-folded portion to push out the roll-folded portion downward, with which the airbag cover is push-opened, thereby quickening popping out of the roll-folded portion and inflation and deployment of the airbag. However, in this airbag, depending on the deployment state of the non-roll-folded portion, the direction in which the roll-folded portion is pushed out and is deployed may vary.

FIG. 7 includes schematic views showing examples of a conventional airbag device having such an airbag, in which the airbag before deployment and after starting to be deployed is schematically shown in cross section.

Figure 7A:
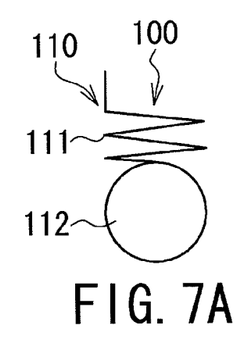
FIG. 7 includes schematic views showing examples of a conventional airbag device having an airbag.

In this conventional airbag device 100, as shown, an airbag 110 (see FIG. 7A) includes a non-roll-folded portion (bellows portion) 111 that is folded in a bellows manner on the upper edge side, and a roll-folded portion 112 (illustrated as a circle in the figure) that is roll-folded on the lower edge side. The upper edge of the bellows portion 111 is attached to the upper part of the vehicle's side wall (not shown). Furthermore, the airbag 110 starts to be deployed from the bellows portion 111 by the gas supplied from an inflator (not shown). The deploying bellows portion 111 pushes and presses the entirety of the roll-folded portion 112 downward.

Figure 7B:
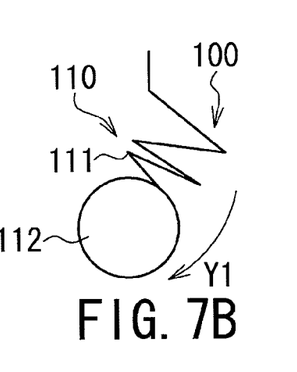
Figure 7C:
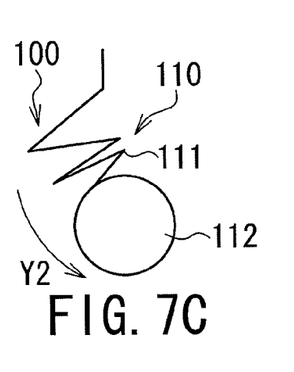

At this time, in this airbag device 100, due to the folding shape of the bellows portion 111, the error or fluctuation of the relative position between the bellows portion 111 and the roll-folded portion 112, or the like, the direction in which the bellows portion 111 is deployed may vary (see FIGS. 7B and 7C). This may vary the direction in which the roll-folded portion 112 is pushed out in both directions in the vehicle's width direction (see arrows Y1 and Y2 in FIGS. 7B and 7C) and may fluctuate the direction in which the roll-folded portion 112 pops out of the airbag cover (not shown). As a result, in this airbag device 100, the deployment direction of the airbag 110 (in particular, the deployment direction at the initial stage of inflation and deployment) may vary, leading to a failure to sufficiently ensure stable deployment properties of the airbag 110.

CITATION LIST

Patent Literature

PTL 1: Japanese Unexamined Patent Application, Publication No. 2004-58848

SUMMARY OF INVENTION

Technical Problem

The present invention has been made in view of the above-described conventional problem, and an object thereof is to suppress variations of the deployment direction of the airbag inflated and deployed from the upper part of a vehicle and to quickly and stably inflate and deploy the airbag along the inner side wall of the vehicle, thereby assuredly restraining and protecting an occupant.

Solution to Problem

The present invention is an airbag device including a folded airbag attached to an upper part of an inner side wall of a vehicle along a vehicle's front-rear direction; a trim that covers the airbag at the vehicle's interior side; and an inflator that supplies gas to the airbag to inflate and deploy the airbag to the lower side of the vehicle from the trim. The airbag includes a bellows portion that is formed by bellows-folding an upper edge side and a roll-folded portion that is formed by roll-folding a lower edge side toward a vehicle's exterior side and is continuous with the bellows portion. The roll-folded portion is roll-folded such that it is longer than the bellows portion in the vehicle's width direction and is folded back upward so as to wrap from below and accommodate the bellows portion.

Advantageous Effects of Invention

According to the present invention, it is possible to suppress variations of the deployment direction of the airbag inflated and deployed from the upper part of a vehicle and to quickly and stably inflate and deploy the airbag along the inner side wall of the vehicle, thereby assuredly restraining and protecting an occupant.

DESCRIPTION OF EMBODIMENTS

An embodiment of an airbag device according to the present invention will be described with reference to the drawings.

This airbag device is an airbag device that inflates and deploys an airbag from the upper part of an inner side wall in a vehicle to the lower side along the inner side wall of the vehicle. The airbag device includes an inflatable and deployable airbag that is folded in a predetermined state and an inflator that generates and supplies gas to the airbag in an emergency of a vehicle or when an impact is detected. Furthermore, the following embodiment will be described taking a side airbag device as an example, in which the airbag is inflated and deployed in a curtain-like manner from an upper side portion of a vehicle and is deployed in a predetermined area of the inner side of the vehicle from the driver's seat or the passenger seat to the rear seat in the rear of the vehicle, thereby protecting mainly the head of an occupant in the front seat or the rear seat.

Figure 1:
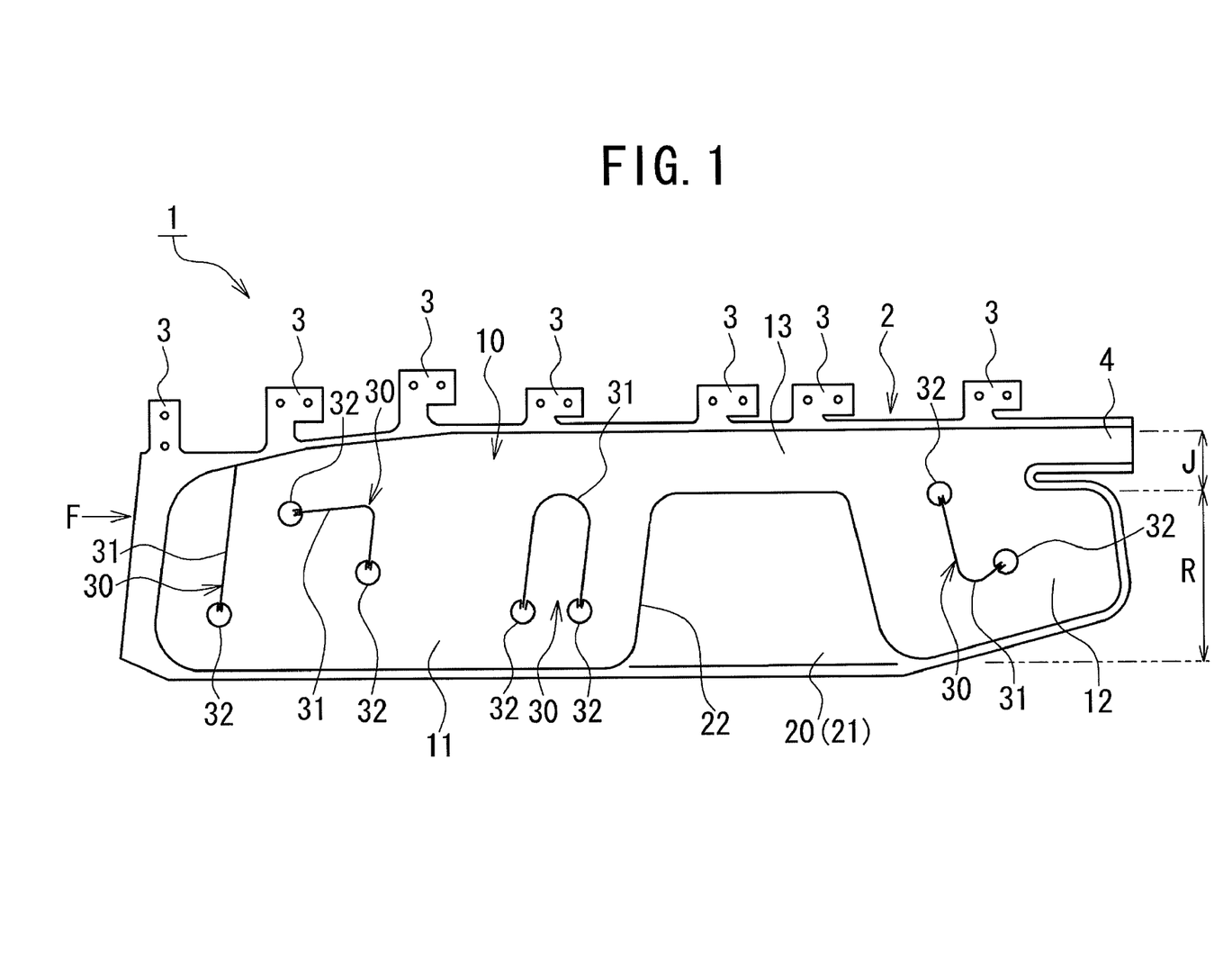
FIG. 1 is a schematic front view showing the relevant part of an airbag of an airbag device according to this embodiment.

FIG. 1 is a schematic front view showing the relevant part of an airbag of an airbag device according to this embodiment, and is a developed schematic plan view showing the shape of the deployed airbag.

In FIG. 1, the side of a gas inlet 4 (described below) (on the right side of an oblong airbag 2 in the figure), to which an inflator (not shown) is attached, is the rear side (rear pillar side) of a vehicle, and the opposite side (on the left side of the airbag 2 in the figure) is the front side (front pillar side) of the vehicle. Furthermore, in the airbag device 1 according to this embodiment, the airbag 2 is disposed and stored in a roof rail portion or the like (not shown) at an upper side portion of the vehicle (above the airbag 2 in the figure), and is inflated and deployed in a curtain-like manner, by the introduction of the gas to the lower side of the vehicle from the stored state. Thus, the airbag 2 is inflated and deployed along an inner side wall of the vehicle, including a side window of the vehicle (located on the far side of the plane of paper in the figure) (not shown), so as to cover the entirety thereof and is inflated and deployed between the occupant and the side wall or the like.

As shown in the figure, the airbag 2 has an oblong, substantially bag-like shape conforming to the shape of the window in the inner side wall of the vehicle to be covered and has a plurality of (seven in the figure) substantially rectangular attaching tabs 3, along the upper edge of the airbag 2. The attaching tab 3 is attached to the roof rail portion of the vehicle. Furthermore, the airbag 2, before being inflated, is stored and disposed in a trim (airbag cover) provided at several positions of the vehicle, such that the attaching tab 3 is fixed and attached to a predetermined position of the vehicle with a bolt. At this time, as will be described below, the airbag 2 is stored such that it can be inflated and deployed mainly downward by being folded in a predetermined state, i.e., the attaching tab 3 side (upper edge side) is bellows-folded and the lower edge side is roll-folded.

Accordingly, the airbag device 1 includes other configurations similar to those of the conventional airbag devices, such as a trim that accommodate the airbag 2 or the like attached to the vehicle in a predetermined state and that covers the vehicle's interior side while the airbag 2 is not operated, the trim being attached to the roof rail portion or the like along the storage position; the inflator that supplies gas to the folded airbag 2, thereby inflating and deploying the airbag 2 from the inside of the trim to the lower side of the vehicle in an emergency or the like of the vehicle; and fixing means that fixes the airbag 2 and the inflator to the vehicle (all of the aforementioned are not shown). When the inflator is activated in this state, the stored airbag 2 is inflated and push-opens the trim and, from there, is inflated and deployed in a curtain-like manner mainly to the lower side of the vehicle.

This airbag 2 is formed in a substantially bag-like shape by connecting opposing base fabrics to each other in an airtight manner at a predetermined position by, for example, layering two base fabrics having the same shape, formed by cutting a woven fabric, or folding a single base fabric having a substantially symmetric shape and then sewing or bonding them together along the edge, thereby forming an inflatable air chamber (cell) 10 therebetween.

In this embodiment, the airbag 2 is formed of a front-side base fabric 20 on the occupant side and a rear-side base fabric 21 at the inner side wall of the vehicle, the base fabrics 20 and 21 being symmetrical to each other (herein, an oblong, substantially rectangular shape). The opposing base fabrics 20 and 21 are layered and connected to each other along an outer peripheral connecting portion 22. This outer peripheral connecting portion 22 divides the inside and outside of the airbag 2 and defines the outer peripheral shape of the air chamber 10. The outer peripheral connecting portion 22 is formed by sewing the base fabrics 20 and 21 together once or several times along the position corresponding to the outer periphery of the air chamber 10 to be formed. Thus, the air chamber 10 is formed into a bag-like shape extending continuously in the front-rear direction of the vehicle, the air chamber 10 including a front air chamber 11 having a substantially rectangular shape in plan view for mainly protecting an occupant in the front seat, a rear air chamber 12 smaller than the front air chamber 11, having a substantially rectangular shape in plan view for mainly protecting an occupant in the rear seat, and a connecting portion 13 connecting the upper portions of the air chambers 11 and 12. Note that the connecting portion 13 is formed such that it is narrower, i.e., has a smaller top-bottom dimension, than the air chambers 11 and 12 and is disposed linearly between the air chambers 11 and 12 so as to extend along the upper edge of the airbag 2.

Furthermore, in this airbag 2, the base fabrics 20 and 21 are projected outward at an upper portion of one end (herein, on the rear side of the vehicle), and a portion at which the base fabrics 20 and 21 are not connected to each other is provided between ends of the outer peripheral connecting portion 22 that connects these base fabrics 20 and 21, thereby forming the substantially tubular gas inlet 4. That is, the gas inlet 4 is an opening at which a part of the rear air chamber 12 is open to the outside of the airbag 2 and the inside and outside of the air chamber 10 communicate with each other, and it serves as a gas supply port (flow-in port) that allows the gas from the inflator to be introduced into the airbag 2 and to be supplied and flowed into the air chamber 10.

In the airbag device 1, one end (gas discharge port) of the substantially tubular cylinder-type inflator is inserted into the gas inlet 4 with, for example, a gas-guiding member or a gas-rectifying member interposed therebetween, and they are fixed together using a clamp (band) (not shown) fastened from the outside. Thus, the inflator is attached to the gas inlet 4 in an air-tight manner, allowing the gas generated by the inflator to be introduced from the gas inlet 4, to be supplied into the air chamber 10 of the airbag 2, and to flow into the rear air chamber 12. Furthermore, the gas is allowed to flow into the front air chamber 11 from the connecting portion 13, thereby supplying the gas to the entire air chamber 10 and inflating and deploying the airbag 2.

Furthermore, in the airbag 2, the opposing base fabrics 20 and 21 are connected to each other also at connecting portion (inner connecting portion) 30 provided in the air chamber 10, and each of the air chambers 11 and 12 is defined at least on both side of the inner connecting portion 30. The inner connecting portion 30 serves as a partition wall that forms a gas flow path and inflation portion inside the air chamber 10 and serves to suppress the inflation of the air chambers 11 and 12 in the thickness direction (in the figure, the direction perpendicular to the plane of paper) to restrict the inflation thickness and the deployment shape. The inner connecting portion 30 is formed in a predetermined shape according to the purpose, and one or a plurality of inner connecting portions 30 may be disposed at a predetermined position in the air chamber 10. Herein, in the front air chamber 11, three inner connecting portions 30, namely, sequentially from the connecting portion 13 side, one having a substantially inverted U-shape, one having a substantially L-shape, and one having a straight-line shape extending vertically, are disposed at a distance from one another in the lateral direction. On the other hand, in the rear air chamber 12, one inner connecting portion 30 having a substantially L-shape is disposed at the center.

Herein, although the base fabrics 20 and 21 may be non-coated base fabrics, they may be coated base fabrics having coating layers composed of resin or rubber having heat resistance and airtightness. In such a case, the base fabrics 20 and 21 are connected to each other such that the surfaces having coating layers face each other. Furthermore, in this airbag device 1, the connecting portions 22 and 30 are each formed of an adhesive layer at which the base fabrics 20 and 21 are bonded to each other with an adhesive and a sewn portion at which the base fabrics 20 and 21 are sewn together, the sewn portion being provided in the adhesive layer. That is, the base fabrics 20 and 21 are connected to each other with an adhesive and by sewing. Moreover, each inner connecting portion 30 is provided with a first sewn portion 31 formed by sewing the opposing base fabrics 20 and 21 together, the first sewn portion 31 extending in a predetermined direction and dividing the air chamber 10, and a substantially circular second sewn portion 32 that encircles each end of the first sewn portion 31 terminated in the air chamber 10 to protect the end. This increases the strength in the vicinity of the end of the inner connecting portion 30 and prevents damage thereto.

The thus-configured airbag 2, before being attached to the vehicle, is folded together with the inflator etc., in such a shape that it can be attached to the vehicle. At this time, in this airbag 2, the upper edge side attached to the vehicle is vertically bellows-folded to form a bellows portion, and the lower edge side on the lower side in the deployment direction is sequentially roll-folded from the lower edge portion toward the upper edge side, toward the vehicle's exterior side (in the figure, far side of the plane of paper) to form a roll-folded portion continuous with the bellows portion.

Furthermore, in this airbag device 1, the bellows portion is formed by folding an area in the vicinity of the upper end of the airbag 2, the area including the gas inlet 4 and the connecting portion 13 and also serving as a supplying path for mainly supplying the gas from the inflator to the entirety of the air chamber 10 (area J in the figure), several times to a predetermined width along fold lines extending in the front-rear direction of the vehicle, alternately in opposite directions. On the other hand, the roll-folded portion is formed by sequentially rolling up an area below and continuous with the bellows portion of the airbag 2, the area including the entirety of the air chambers 11 and 12 except for the upper edge side thereof and serving as a main inflation portion that mainly covers the inner side wall of the vehicle and comes into contact with the occupant during inflation and deployment (area R in the figure), upward from the lower edge, to a predetermined width. Furthermore, herein, the airbag 2 is folded such that an area of about ¾ from the lower edge is roll-folded and an area of about ¼ from the upper edge is bellows-folded, and the bellows portion is accommodated in the roll-folded portion. The steps of folding the airbag 2 will be described in more detail below.

FIG. 2 includes schematic views showing, in sequence, the steps of folding the airbag 2, which schematically show, in lines, cross-sections of the airbag 2 viewed from the direction of arrow F in FIG. 1.

Figure 2A:
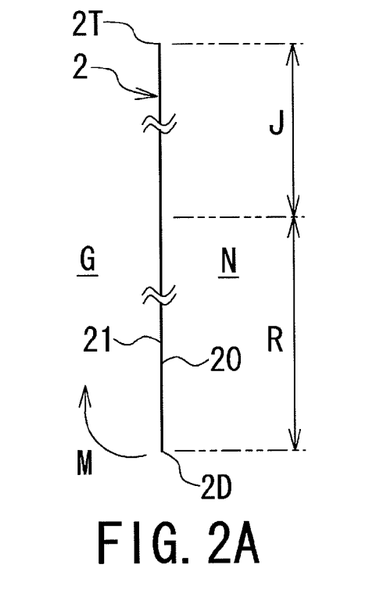
FIG. 2 includes schematic views showing, in sequence, the steps of folding the airbag according to this embodiment.

In this embodiment, as shown, first, the airbag 2 in a non-inflated state is spread out, and the base fabrics 20 and 21 are overlapped and are flatly deployed (see FIG. 2A). Next, a lower edge 2D of the airbag 2 is folded back toward an upper edge 2T so as to be furled in a vehicle's exterior side G (arrow M in FIG. 2A), and the area R on the above-described lower edge 2D side is roll-folded upward.

Figure 2B:
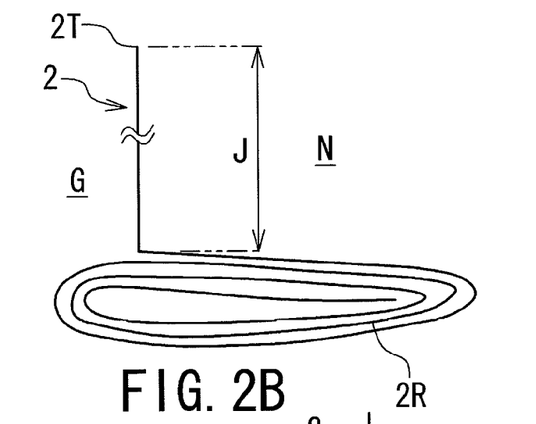
Figure 2C:
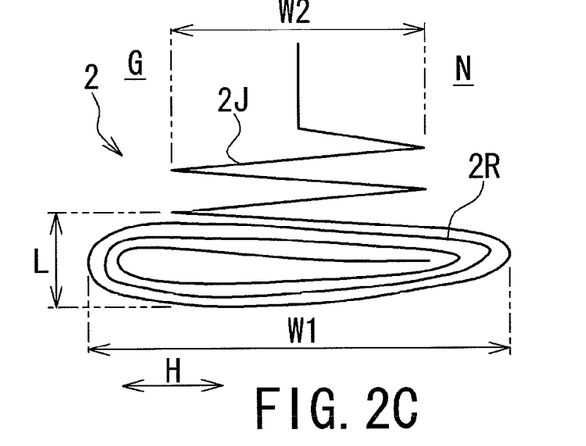

At this time, the airbag 2 is sequentially furled such that it is folded several times to a predetermined width from the lower edge 2D toward the upper edge 2T, to the rear-side base fabric 21 side (see FIG. 2B). Thus, a wide roll-folded portion 2R is formed such that a portion including the lower edge 2D is located inside. Next, the above-described area J of the airbag 2 on the upper edge 2T side is folded to a substantially constant width vertically from the roll-folded portion 2R side or the upper edge 2T side to the other side, alternately in opposite directions (in the figure, the left and right directions), to form an bellows portion 2J (see FIG. 2C). Then, the bellows portion 2J is arranged to be overlaid on the roll-folded portion 2R.

In FIG. 2, the folded state of the airbag 2 is schematically shown such that gaps are left in the airbag 2. However, in reality, the airbag 2 is folded so as to be layered. Furthermore, in this airbag device 1, the roll-folded portion 2R of the airbag 2 is roll-folded such that it is larger in the vehicle's width direction (lateral direction) (the direction of arrow H in FIG. 2C) than the bellows portion 2J. That is, the width W1 of the roll-folded portion 2R in the vehicle's width direction H is larger in the aforementioned direction than the width W2 of the bellows portion 2J (W1>W2). Herein, the width W1 of the roll-folded portion 2R is twice or more the width W2 of the bellows portion 2J. In this state, the relatively narrow bellows portion 2J is arranged to be overlaid on substantially the central portion of the roll-folded portion 2R. In addition, in this state, the roll-folded portion 2R is roll-folded such that it is larger in the vehicle's width direction H than in the vehicle's top-bottom direction as viewed in cross-section in the vehicle's width direction, and is formed in a substantially oval shape in cross-section, in which the width W1 is larger than the folding thickness L (W1>L).

Figure 2D:
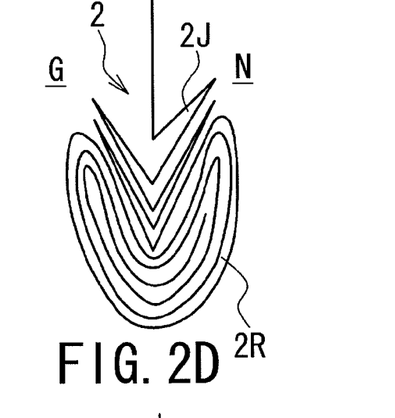
Figure 2E:
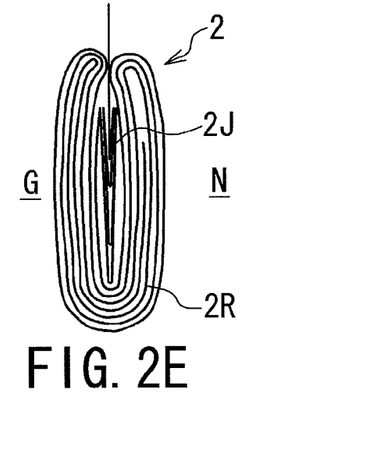

Next, the roll-folded portion 2R of the airbag 2 is folded upward at substantially the vicinity of the central portion in the vehicle's width direction H, and the side portions thereof are folded back upward (see FIG. 2D). The bellows portion 2J is folded upward in substantially half at substantially the vicinity of the central portion in the vehicle's width direction H similarly to the roll-folded portion 2R, and is wrapped by this roll-folded portion 2R from below along both sides and accommodated therein (see FIG. 2E). Thus, substantially the entirety of the bellows portion 2J is disposed in the roll-folded portion 2R. In this manner, the entire airbag 2 is folded such that it can be inflated and deployed, and a breakable wrapping member (not shown) for keeping the folding shape is appropriately wrapped at a predetermined position in the longitudinal direction thereof. Thus, the folding is completed. Thereafter, the folded airbag 2, together with the inflator etc., is attached to a predetermined position of the upper part of the inner side wall of the vehicle, along the vehicle's front-rear direction.

Figure 3:
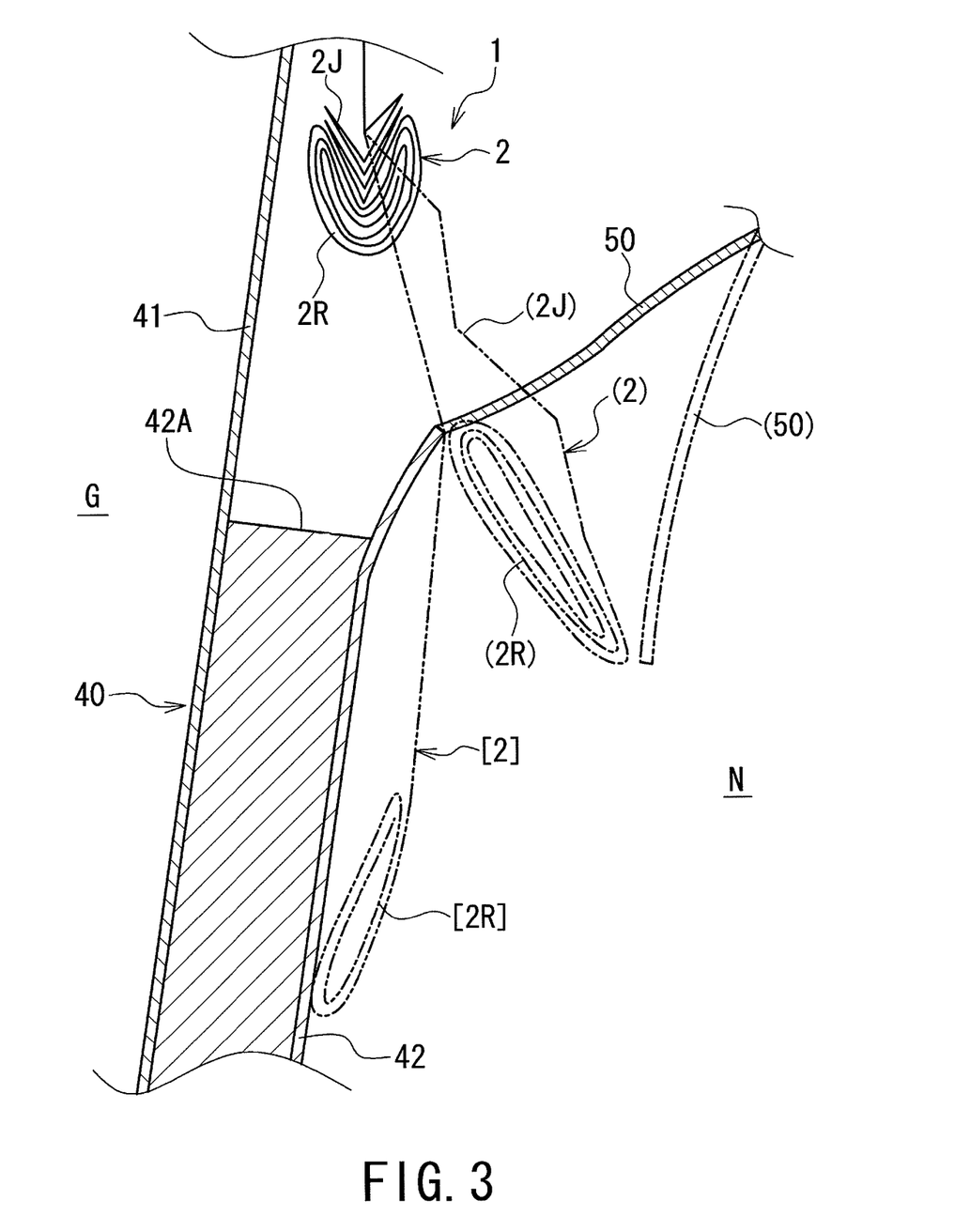
FIG. 3 is a schematic view of the relevant part showing the airbag attached to the vehicle.

FIG. 3 is a schematic view of the relevant part showing the airbag 2 attached to the vehicle, and it schematically shows cross-sections at a center pillar portion 40 of the vehicle.

As shown, the airbag 2 in a folded state (indicated by a solid line in the figure) is attached to a roof rail portion of the vehicle such that the upper edge (attaching tab 3) of the bellows portion 2J is fixed to an inner panel (not shown) by the above-mentioned fixing means and such that the roll-folded portion 2R surrounding the bellows portion 2J is positioned on the lower side. Furthermore, the airbag 2, the entirety of which at the vehicle's interior side N (cabin side) being covered by the trim 50 that is formed of, for example, synthetic resin and is attached to the vehicle so as to be openable, is stored between the inner panel 41, the trim 50, and an upper end 42A of the pillar garnish 42 covering the inner panel 41.

The airbag device 1 is installed in the vehicle in this manner, and it activates the inflator (not shown) to generate gas during a collision or the like of the vehicle and supplies the gas into the airbag 2 (air chamber 10). Thus, the gas is allowed to flow into the air chamber 10, inflating the air chambers 11 and 12, and the airbag 2 is unfolded, inflated, and deployed in a curtain-like manner from the attaching tabs 3, i.e., the upper part of the vehicle's side wall, toward the cabin on the lower side of the vehicle (in the figure, two-dot chain lines sequentially indicate deploying states).

During this inflation and deployment, the gas from the inflator is first supplied to the bellows portion 2J of the airbag 2 through the gas inlet 4, sequentially unfolding the bellows-like folding from the upper edge 2T. As a result, in the airbag 2, first, the bellows portion 2J on the upper edge 2T side is deployed so as to sequentially push out the roll-folded portion 2R from the upper side to the lower side, and, in response to this, it presses the entire roll-folded portion 2R on the lower side toward the trim 50 on the lower side so as to maintain roll-folding thereof. At this time, because the bellows portion 2J is sandwiched between the roll-folded portion 2R that is folded back at both sides in the vehicle's width direction and is entirely wrapped from below, the bellows portion 2J deploys in the roll-folded portion 2R while opening it toward both sides thereof and is sequentially inflated and deployed while pushing out the roll-folded portion 2R mainly downward at the initial stage of the deployment.

That is, the deployment of the bellows portion 2J in the vehicle's width direction is restricted by the roll-folded portion 2R on both sides and the bellows shape of the bellows portion 2J is not unfolded unless it deploys in the roll-folded portion 2R while pushing out the roll-folded portion 2R downward. Thus, the deployment of the bellows portion 2J is directed toward the lower side of the vehicle, whereby the deployment of the bellows portion 2J in the vehicle's width direction and variations of the deployment direction thereof are suppressed. As a result, the roll-folded portion 2R is pushed out by the deploying bellows portion 2J in a predetermined direction on the lower side of the vehicle with no variations and is pressed toward the trim 50. Then, it push-opens the trim 50 with this force (indicated by the two-dot chain lines in the figure) and stably pops out to the lower side of the vehicle's interior side N with no variations.

Then, in the airbag 2, the bellows portion 2J is further deployed toward the lower side of the vehicle, and, in accordance with the deployment, the gas is sequentially supplied to the roll-folded portion 2R, which sequentially unfolds and deploys the roll-folded portion 2R downward in the direction opposite the winding direction from the portion continuous with the bellows portion 2J. At this time, because the roll-folded portion 2R is roll-folded toward the vehicle's exterior side G, it deploys toward the lower side of the vehicle along the window in the inner side wall of the vehicle positioned on the vehicle's exterior side G (in FIG. 3, the surface of the pillar garnish 42 on the vehicle's interior side N). In this manner, the airbag device 1 inflates and deploys the entire airbag 2 between the occupant and the inner side wall of the vehicle, thereby receiving and restraining the incoming occupant by the inflated air chamber 10 and restricting the occupant to protect mainly the head thereof.

In this airbag 2, the upper edge 2T side, which deploys first, is bellows-folded to achieve a high deployment speed and forms the bellows portion 2J. That area is quickly deployed, causing the roll-folded portion 2R to pop out to the vehicle's interior side N at an early stage, whereby the inflation and deployment speed of the airbag 2 is increased and the deployment characteristics are improved. In addition, the length of this airbag 2 on the upper edge 2T side to be bellows-folded is set such that the roll-folded portion 2R is popped out to the inside of the vehicle from the trim 50 in a state where the bellows portion 2J is inflated and deployed, and the set area of the airbag 2 on the upper edge 2T side is bellows-folded to form the bellows portion 2J. Thus, the airbag 2 is configured such that only the bellows portion 2J deploys while maintaining roll-folding of the roll-folded portion 2R in the trim 50, and the roll-folded portion 2R is quickly pressed against and push-opens the trim 50, thereby causing the roll-folded portion 2R to pop out of the trim 50 into the cabin at an early stage.

Furthermore, in this embodiment, the bellows portion 2J deploys toward the trim 50 so as to push out mainly the roll-folded portion 2R toward the lower side of the vehicle, allowing the deployment force to act only on the roll-folded portion 2R so that a force in the opening direction acts on the trim 50 via the roll-folded portion 2R. In this manner, the airbag 2 allows a quick and great deployment force from the bellows portion 2J to act on the roll-folded portion 2R, causing the roll-folded portion 2R to push-open the trim 50 and allowing the roll-folded portion 2R to pop out and quickly deploy on the vehicle's interior side N. Furthermore, even if the airbag 2 comes into contact with, for example, different position of the pillar garnish 42 before it deploys into the vehicle's interior side N because the deployment direction of the bellows portion 2J is shifted to some extent in the vehicle's width direction, a rotary force in the direction from the pillar garnish 42 to the vehicle's interior side N acts on the wide roll-folded portion 2R, whereby the airbag 2 is assuredly deployed in the cabin.

FIGS. 4 and 5 are schematic views showing the relevant part for describing deployment of the airbag 2 near the pillar garnish 42, in which the stages of deployment of the deploying airbag 2 and the like, extracted from FIG. 3, are sequentially shown. Furthermore, FIG. 4 shows states in which the deployment direction of the bellows portion 2J (arrow U in FIG. 4A) is shifted to the vehicle's interior side N, and FIG. 5 shows states in which the deployment direction of the bellows portion 2J (arrow S in FIG. 5A) is shifted to the vehicle's exterior side G.

Figure 4A:
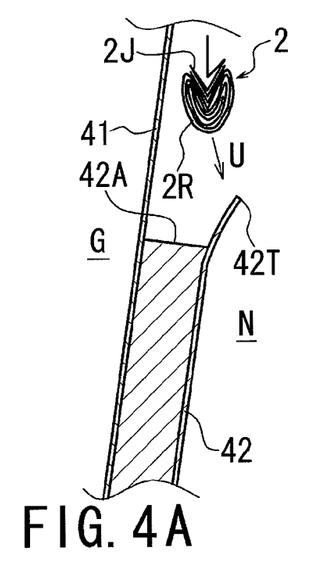
FIG. 4 includes schematic views showing the relevant part for describing deployment of the airbag near a pillar garnish.
Figure 4B:
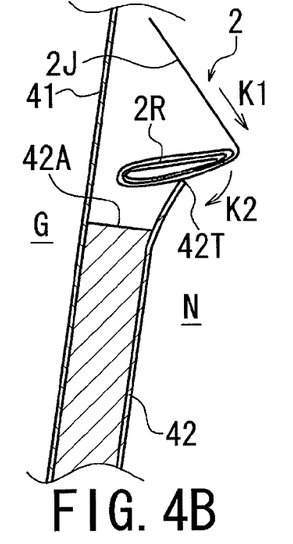
Figure 4C:
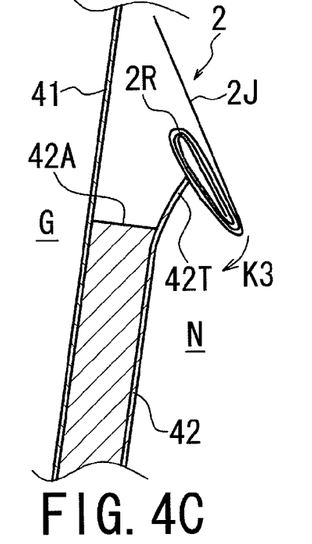
Figure 4D:
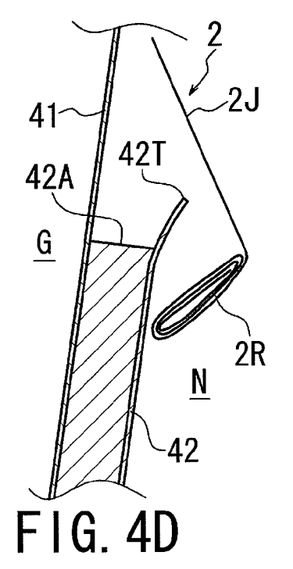
Figure 4E:
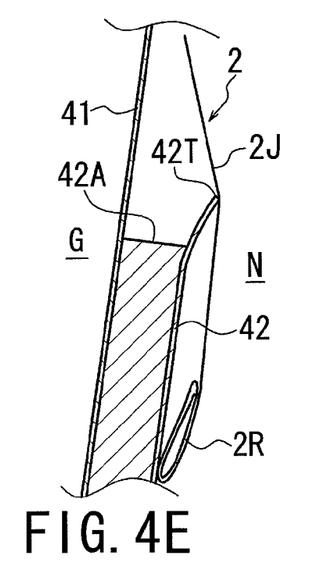

When the bellows portion 2J deploys toward the vehicle's interior side N, as shown in FIG. 4, the airbag 2 deploys toward a projection 42T extending above the pillar garnish 42 while the roll-folded portion 2R is press-opened (see FIG. 4A). Then, when the central region of the widely opened roll-folded portion 2R (see FIG. 4B) comes into contact with the projection 42T, the deploying bellows portion 2J pushes the roll-folded portion 2R at a portion on the vehicle's interior side N with respect to the projection 42T (arrow K1 in FIG. 4B), whereby the force in the same direction (see arrow K2 in FIG. 4B) acts on the entire roll-folded portion 2R. In this manner, the deployment force K1 of the bellows portion 2J acts on the roll-folded portion 2R, generating a rotary force K2 directed from the projection 42T to the vehicle's interior side N (clockwise in FIG. 4) in the roll-folded portion 2R. Then, the entire roll-folded portion 2R is rotated in the above-mentioned direction (see FIG. 4C) and is moved from the projection 42T to the vehicle's interior side N (see arrow K3 in FIG. 4C). This causes the roll-folded portion 2R to pop out into the cabin (see FIG. 4D), unfolding the bellows-fold of the bellows portion 2J and the roll-fold of the roll-folded portion 2R, and to deploy along the pillar garnish 42, as described above (see FIG. 4E).

Figures 5A, 5B:
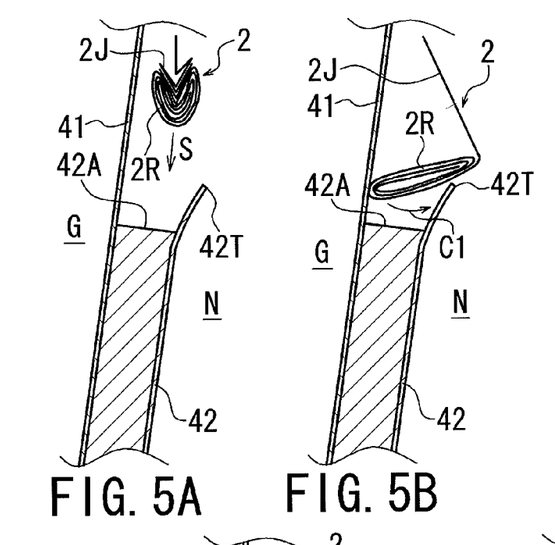
FIG. 5 includes schematic views showing the relevant part for describing deployment of the airbag near the pillar garnish.
Figure 5C:
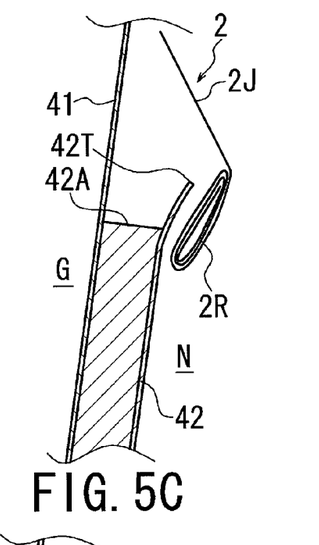
Figure 5D:
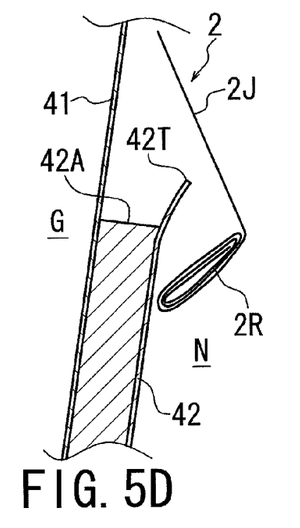
Figure 5E:
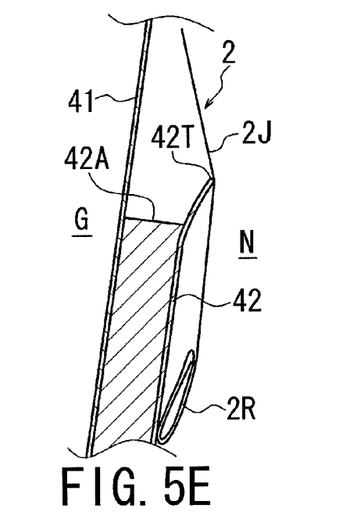

In contrast, when the bellows portion 2J deploys toward the vehicle's exterior side G, as shown in FIG. 5, the airbag 2 deploys toward the upper end 42A of the pillar garnish 42 (herein, between the projection 42T and the inner panel 41) while the roll-folded portion 2R is press-opened (see FIG. 5A). Then, when a portion on the vehicle's interior side N of the widely opened roll-folded portion 2R (see FIG. 5B) comes into contact with the projection 42T, the roll-fold toward the vehicle's exterior side G of the roll-folded portion 2R that is continuous with the bellows portion 2J, is unfolded, and a force directed toward the projection 42T acts on the roll-folded portion 2R (see arrow C1 in FIG. 5B). In this manner, a rotary force C1 in the direction in which the roll-folded portion 2R climbs over the projection 42T (counter-clockwise in FIG. 5) is generated in the roll-folded portion 2R, which rotates the entire roll-folded portion 2R in the above-mentioned direction and causes it to climb over the projection 42T and to move toward the vehicle's interior side N. This causes the roll-folded portion 2R to pop out into the cabin (see FIG. 5C), unfolding the bellows-fold of the bellows portion 2J and the roll-fold of the roll-folded portion 2R, and to deploy along the pillar garnish 42, as described above (see FIGS. 5D and 5E).

In the above-described airbag 2 according to this embodiment, because the upper edge 2T side, which deploys first, is bellows-folded to form the bellows portion 2J, the deployment speed at the initial stage of deployment can be increased and the airbag 2 can be quickly deployed in the trim 50. At the same time, because the bellows portion 2J is wrapped from below by the roll-folded portion 2R on the lower edge 2D and is accommodated therein, the deployment direction of the bellows portion 2J can be restricted as described above, and variations of the deployment direction in the vehicle's width direction can be suppressed. Thus, the bellows portion 2J can be assuredly deployed in a predetermined direction on the lower side of the vehicle. As a result, it is possible to cause the roll-folded portion 2R to be assuredly and quickly pushed out toward the trim 50 by the bellows portion 2J and to be popped out of the trim 50 into the cabin at an early stage, while variations of the direction are suppressed. In addition, it is possible to stably deploy the airbag 2 and increase the deployment speed.

Moreover, in this airbag 2, even if errors or fluctuations occur to some extent in the folding shape of the bellows portion 2J or in the relative position between the folded bellows portion 2J and roll-folded portion 2R in a folded state, it is possible to suppress variations of the deployment direction of the bellows portion 2J, whereby deployment of the bellows portion 2J and popping out of the roll-folded portion 2R can be stably and quickly performed. Furthermore, because the bellows portion 2J pushes out mainly the roll-folded portion 2R toward the lower side of the vehicle to cause the deployment force to act only on the roll-folded portion 2R, deployment in other directions and dispersion of the deployment force can be suppressed, which enables the deployment to progress quickly and increases the deployment speed of the entire airbag 2. At the same time, because the gas is supplied only in the direction in which the airbag 2 is to be deployed (the deployment direction of the roll-folded portion 2R) through the bellows portion 2J, it is possible to suppress pressure loss of the gas and to quickly and smoothly supply the gas to the roll-folded portion 2R.

In accordance with this, it is possible to complete opening of the trim 50 by the roll-folded portion 2R early and to perform popping out of the roll-folded portion 2R into the cabin early while suppressing variations of the direction. Thus, the entire airbag 2 can be quickly and stably deployed. At this time, because the roll-folded portion 2R is roll-folded toward the vehicle's exterior side G, the airbag 2 is stably deployed toward the lower side of the vehicle along the window in the inner side wall of the vehicle, due to the winding direction of the roll-folded portion 2R. Thus, the occupant can be assuredly received and restrained by the inflated air chamber 10. Furthermore, as described above, because this airbag 2 can be assuredly deployed in the cabin without being caught in the pillar garnish 42 or the like positioned on the front side in the deployment direction, it is possible to assuredly inflate and deploy the entire airbag 2 to protect the occupant. As a result, for example, even when the airbag 2 deploys while the occupant's head is in contact with the window in the vehicle's side surface (so-called "Head On Glass"), it is possible to assuredly deploy the airbag 2 between the occupant's head and the window to protect the occupant, and it is also possible to cope with overturning of the vehicle or the like.

Accordingly, in this embodiment, it is possible to suppress variations of the deployment direction occurring in the airbag 2 inflated and deployed from the upper part of the vehicle and to quickly and stably inflate and deploy the airbag 2 along the inner side wall of the vehicle to improve the deployment characteristics thereof, whereby it is possible to assuredly restrain and protect the occupant. In addition, herein, in the airbag 2, because the bellows portion 2J is bellows-folded such that the roll-folded portion 2R is popped out of the trim 50 in a state where the bellows portion 2J is inflated and deployed, only the bellows portion 2J is quickly deployed in the trim 50, causing the roll-folded portion 2R to be popped out of the trim 50 early. Furthermore, because the roll-folded portion 2R deploys as described above after that, it is possible to more assuredly deploy the airbag 2 along the inner side wall of the vehicle and to further suppress variations of the deployment direction in the vehicle's width direction.

In addition, in this airbag device 1, because the roll-folded portion 2R is roll-folded into a substantially oval shape in cross-section having large width such that it is larger in the vehicle's width direction than in the vehicle's top-bottom direction, it is possible to easily fold the roll-folded portion 2R or wrap the bellows portion 2J. At the same time, in the roll-folded portion 2R having such a shape, a portion having a large radius of curvature deploys at a higher deployment speed than a portion having a small radius of curvature. Thus, development speed of the roll-folded portion 2R is relatively higher than that of the roll-folding portion having a substantially circular shape in cross-section, and the roll-folded portion 2R can be more quickly deployed. Furthermore, because it is easier for the substantially oval-shaped roll-folded portion 2R to escape into the cabin when it comes into contact with the pillar garnish 42, the airbag 2 can be assuredly deployed, and delay in deployment can be suppressed.

Herein, although the gas from the inflator is directly supplied to the air chamber 10 in the airbag 2 through the gas inlet 4 in this embodiment, it is also possible that an inner tube is disposed in the airbag 2 to supply gas through the inner tube. This inner tube is a guide member that guides and supplies gas supplied from the inflator to the air chambers 11 and 12 in the airbag 2, and it is disposed on the upper edge 2T side in the airbag 2 along the gas supplying direction to guide and supply the gas over substantially the entire length of the airbag 2. Furthermore, the inner tube is formed by, for example, sewing a base fabric into a substantially tubular shape and is disposed from the gas inlet 4 through the connecting portion 13 to the front air chamber 11. The inner tube supplies the gas from the gas inlet 4 to the front air chamber 11 through the opening at the tip and further supplies the gas to the rear air chamber 12 through a through-hole in the rear air chamber 12.

When such an inner tube is provided, the airbag 2 on the upper edge 2T side is bellows-folded, including, at least, the entirety or a part of the inner tube (herein, the entirety of the position where the inner tube is disposed). Because this allows the inner tube in the bellows portion 2J to deploy prior to the roll-folded portion 2R, it is possible to assuredly and quickly supply the gas over substantially the entire length of the airbag 2 along the vehicle's front-rear direction through the deployed inner tube. Thus, it is possible to make deployment of the airbag 2 smooth. Furthermore, the inner tube is deployed first over substantially the entire length of the airbag 2, and this will prevent the deployment of the airbag 2 from being partially delayed. Thus, it is possible to assuredly and quickly deploy the airbag 2.

Although, in this airbag device 1, the bellows portion 2J is folded toward the upper side of the vehicle and is wrapped by and accommodated in the roll-folded portion 2R, the bellows portion 2J may be folded in the other direction and accommodated in the roll-folded portion 2R.

Figure 6:
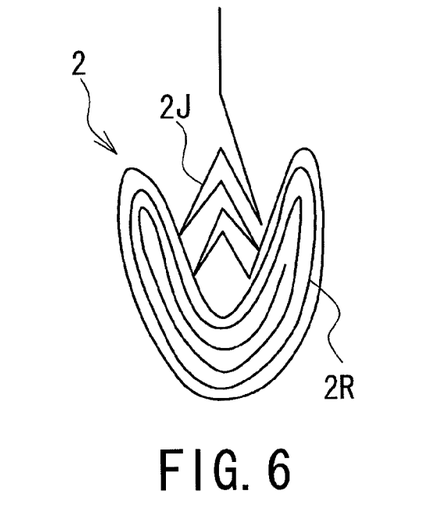
FIG. 6 is a schematic view showing the airbag in a folded state, in which a bellows portion is folded in the other direction.

FIG. 6 is a schematic view showing the airbag 2 in a folded state, in which the bellows portion 2J is folded in the other direction. FIG. 6 corresponds to FIG. 2 and schematically shows the airbag 2 in cross-section.

Herein, as shown, the bellows portion 2J is folded downward in substantially half at the vicinity of the central portion in the vehicle's width direction (in the figure, left-right direction). In the airbag 2, as shown, the roll-folded portion 2R is folded upward in substantially half in a state where the side portions of the bellows portion 2J are folded downward, and the bellows portion 2J is wrapped by the roll-folded portion 2R from below and is accommodated therein (see FIG. 2E). By folding the airbag 2 in this manner, the folded side portions of the bellows portion 2J are oriented to the lower side of the vehicle, which also makes the direction of the supplied gas oriented to the lower side. This allows the bellows portion 2J to deploy toward the lower side, whereby variations in the vehicle's width direction can be further reduced. Furthermore, because it is possible to direct the gas deploying the bellows portion 2J to the lower side of the vehicle, the bellows portion 2J can be more quickly deployed toward the lower side, while suppressing variations of the deployment direction in the vehicle's width direction.

REFERENCE SIGNS LIST

1: airbag device, 2: airbag, 2D: lower edge, 2J: bellows portion, 2T: upper edge, 2R: roll-folded portion, 3: attaching tab, 4: gas inlet, 10: air chamber, 11: front air chamber, 12: rear air chamber, 13: connecting portion, 20, 21: base fabric, 22: outer peripheral connecting portion, 30: inner connecting portion, 31: first sewn portion, 32: second sewn portion, 40: center pillar portion, 41: inner panel, 42: pillar garnish, 50: trim.

The invention claimed is:

1. An airbag device comprising:
a folded airbag attached to an upper part of an inner side wall of a vehicle along a vehicle's front-rear direction; a trim that covers the airbag at the vehicle's interior side; and an inflator that supplies gas to the airbag to inflate and deploy the airbag to the lower side of the vehicle from the trim,
wherein the airbag includes a bellows portion that is formed by bellows-folding an upper edge side and a roll-folded portion that is formed by roll-folding a lower edge side toward a vehicle's exterior side and is continuous with the bellows portion, and
wherein the roll-folded portion is roll-folded such that it is longer than the bellows portion in the vehicle's width direction and is folded back upward so as to wrap from below and accommodate the bellows portion.

2. The airbag device according to claim 1,
wherein the roll-folded portion is roll-folded such that it is longer in the vehicle's width direction than in the vehicle's top-bottom direction.

3. The airbag device according to claim 2,
wherein the bellows portion is accommodated in the roll-folded portion such that the side portions thereof are folded downward.

4. The airbag device according to claim 3, further comprising an inner tube that is disposed on the upper edge side in the airbag and guides the gas supplied from the inflator in the airbag,
wherein the upper edge side of the airbag including, at least, the inner tube is bellows-folded.

5. The airbag device according to claim 4,
wherein the upper edge side of the airbag is bellows-folded such that the roll-folded portion is popped out from the trim in a state where the bellows portion is inflated and deployed.

6. The airbag device according to claim 2, further comprising an inner tube that is disposed on the upper edge side in the airbag and guides the gas supplied from the inflator in the airbag,
wherein the upper edge side of the airbag including, at least, the inner tube is bellows-folded.

7. The airbag device according to claim 6,
wherein the upper edge side of the airbag is bellows-folded such that the roll-folded portion is popped out from the trim in a state where the bellows portion is inflated and deployed.

8. The airbag device according to claim 2,
wherein the upper edge side of the airbag is bellows-folded such that the roll-folded portion is popped out from the trim in a state where the bellows portion is inflated and deployed.

9. The airbag device according to claim 3,
wherein the upper edge side of the airbag is bellows-folded such that the roll-folded portion is popped out from the trim in a state where the bellows portion is inflated and deployed.

10. The airbag device according to claim 1,
wherein the bellows portion is accommodated in the roll-folded portion such that the side portions thereof are folded downward.

11. The airbag device according to claim 10, further comprising an inner tube that is disposed on the upper edge side in the airbag and guides the gas supplied from the inflator in the airbag,
wherein the upper edge side of the airbag including, at least, the inner tube is bellows-folded.

12. The airbag device according to claim 11,
wherein the upper edge side of the airbag is bellows-folded such that the roll-folded portion is popped out from the trim in a state where the bellows portion is inflated and deployed.

13. The airbag device according to claim 10,
wherein the upper edge side of the airbag is bellows-folded such that the roll-folded portion is popped out from the trim in a state where the bellows portion is inflated and deployed.

14. The airbag device according to claim 1, further comprising an inner tube that is disposed on the upper edge side in the airbag and guides the gas supplied from the inflator in the airbag,
wherein the upper edge side of the airbag including, at least, the inner tube is bellows-folded.

15. The airbag device according to claim 14,
wherein the upper edge side of the airbag is bellows-folded such that the roll-folded portion is popped out from the trim in a state where the bellows portion is inflated and deployed.

16. The airbag device according to claim 1,
wherein the upper edge side of the airbag is bellows-folded such that the roll-folded portion is popped out from the trim in a state where the bellows portion is inflated and deployed.

\* \* \* \* \*